US011167505B2

(12) United States Patent
Duval

(10) Patent No.: US 11,167,505 B2
(45) Date of Patent: Nov. 9, 2021

(54) METHOD OF OPERATING AN AUTOMATED FIBER PLACEMENT MACHINE

(71) Applicant: Bell Helicopter Textron Inc., Fort Worth, TX (US)

(72) Inventor: Sébastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 341 days.

(21) Appl. No.: 15/902,285

(22) Filed: Feb. 22, 2018

(65) Prior Publication Data

US 2019/0255784 A1    Aug. 22, 2019

(51) Int. Cl.
*B32B 41/00*    (2006.01)
*B29C 70/38*    (2006.01)
B29C 64/10    (2017.01)
B33Y 10/00    (2015.01)

(52) U.S. Cl.
CPC ............ *B29C 70/388* (2013.01); *B29C 64/10* (2017.08); *B33Y 10/00* (2014.12)

(58) Field of Classification Search
CPC ........ B29C 70/388; B29C 64/10; B33Y 10/00
USPC .................... 156/60, 64, 350, 351, 378, 379
See application file for complete search history.

(56) References Cited

U.S. PATENT DOCUMENTS

| | | |
|---|---|---|
| 5,239,457 A | 8/1993 | Steidle et al. |
| 5,562,788 A * | 10/1996 | Kitson .................. B29C 70/384 |
| | | 156/378 |
| 6,073,670 A | 6/2000 | Koury |
| 2014/0288893 A1* | 9/2014 | Blom ...................... G06F 30/23 |
| | | 703/1 |

FOREIGN PATENT DOCUMENTS

| | | |
|---|---|---|
| CA | 2983809 A1 | 3/2017 |
| CA | 3001786 A1 | 4/2017 |

OTHER PUBLICATIONS

Canadian Office Action in related Canadian Application No. 2,997,075 dated May 13, 2019, 6 pages.

* cited by examiner

*Primary Examiner* — Michael N Orlando
*Assistant Examiner* — Joshel Rivera
(74) *Attorney, Agent, or Firm* — Lightfoot & Alford PLLC

(57) ABSTRACT

A method of operating an automated fiber placement machine including determining an effective length and a steering radius of a localized curved portion of a path and obtaining data including combinations of effective length and steering radius reference values each associated with a corresponding one of maximum speed values. A predetermined defect is avoided when the tape is laid along a curved path characterized by any of the combinations of effective length and steering radius reference values and laid at the corresponding maximum speed value. The method further includes determining a maximum speed based on the maximum speed values of the data in function of a correspondence between the effective length and the steering radius of the curved path and the combinations of effective length and steering radius reference values, selecting a speed for laying the tape being at most the maximum speed, and laying the tape on the surface.

21 Claims, 8 Drawing Sheets

METHOD OF OPERATING AN AUTOMATED FIBER PLACEMENT MACHINE

TECHNICAL FIELD

The application relates generally to composite structure manufacturing and, more particularly, to automated fiber placement methods.

BACKGROUND OF THE ART

Automated fiber placement (AFP) machines are used for laying tapes of fiber tows of uncured fiber-reinforced composite material on a surface. The AFP machines can be programmed to lay each tape along a predetermined path and on a wide variety of surfaces. A number of parameters can be varied upon deposition of a tape of material, such as for example the length of the tape, the steering radius (constant or variable) of the curve followed by the tape, and the speed of the tape deposition. However, the parameters of AFP machines must be carefully selected to avoid the creation of defects in the tapes, for example in the relative position of the fiber tows. To this day, the process of laying tapes of fiber-reinforced composite material using an AFP machine is a trial-and-error process. Hence, improvements are possible.

SUMMARY

In one aspect, there is provided a method of operating an automated fiber placement machine configured for laying a tape on a surface along a path having at least one localized curved portion, the tape being composed of fiber tows disposed side-by-side, the method comprising: determining a steering radius of the at least one localized curved portion; determining an effective length of the at least one localized curved portion; obtaining data including combinations of effective length and steering radius reference values each associated with a corresponding one of maximum speed values, where a creation of a predetermined defect in the tape is avoided when the tape is laid along a given curved path characterized by any of the combinations of effective length and steering radius reference values and laid along the given curved path at the corresponding one of the maximum speed values; determining a maximum speed for laying the tape on the surface along the localized curved portion, the maximum speed being determined based on the maximum speed values of the data in function of a correspondence between the effective length and the steering radius of the localized curved portion and the combinations of effective length and steering radius reference values; selecting a speed for laying the tape on the surface, the selected speed being at most the maximum speed; and laying the tape on the surface at the selected speed with the automated fiber placement machine.

In another aspect, there is provided a method of obtaining data correlating maximum speeds for laying tapes of fiber tows on a surface with an automated fiber placement machine to steering radii and effective lengths of curves to be followed by the tapes for use in determining a maximum speed for laying the tapes while avoiding a creation of a predetermined defect on the tapes laid on the surface, the method comprising: selecting a speed for laying one of the tapes with the automated fiber placement machine along a curved path having a steering radius; laying the tape at the speed and along the curved path; measuring a length of the curved path from a starting point of the curved path to a location where the predetermined defect is created; storing the speed, the steering radius and a reference length based on the measured length in association with each other; and repeating a) to d) with another tape for a different speed and/or a different steering radius.

DESCRIPTION OF THE DRAWINGS

Reference is now made to the accompanying figures in which.

DETAILED DESCRIPTION

Illustrative embodiments of the methods and apparatuses are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
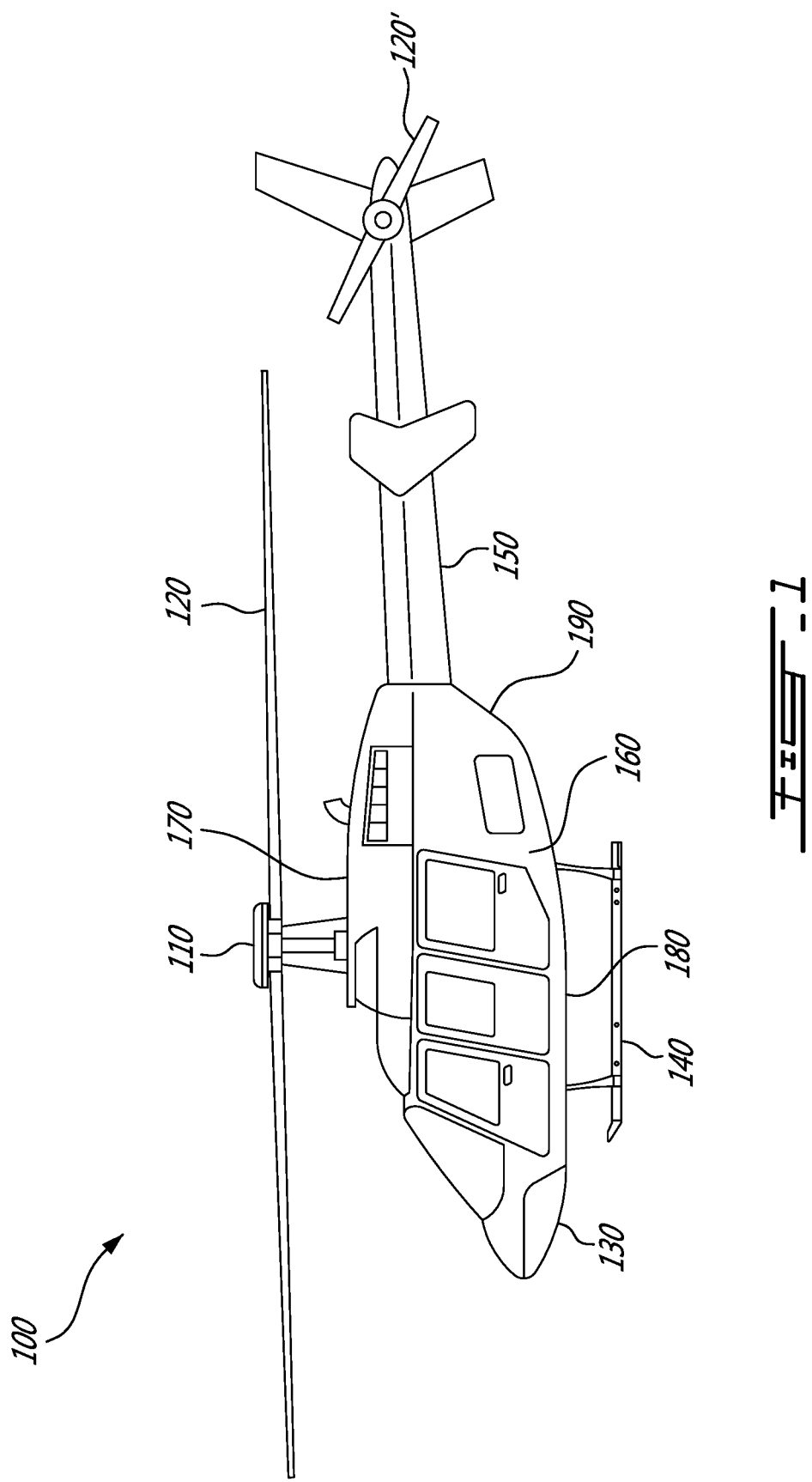
FIG. 1 is a schematic side view of a rotorcraft in accordance with a particular embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 rotates blades 120. Rotor system 110 includes a control system for selectively controlling the pitch of each blade 120 in order to selectively control direction, thrust, and lift of rotorcraft 100. Fuselage 130 represents the body of rotorcraft 100 and is coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' provide thrust in the same direction as the rotation of blades 120 so as to counter the torque effect created by rotor system 110 and blades 120. It should also be appreciated that teachings regarding rotorcraft 100 may apply to aircraft and vehicles other than rotorcraft, such as airplanes and unmanned aircraft, to name a few examples.

The present disclosure provides for a method of automated fiber placement which may be used to form components of the rotorcraft 100, for example, a part or a whole of the fuselage 130. It is however understood that the method described herein may be applied to form any other suitable type of composite component.

Figure 2:
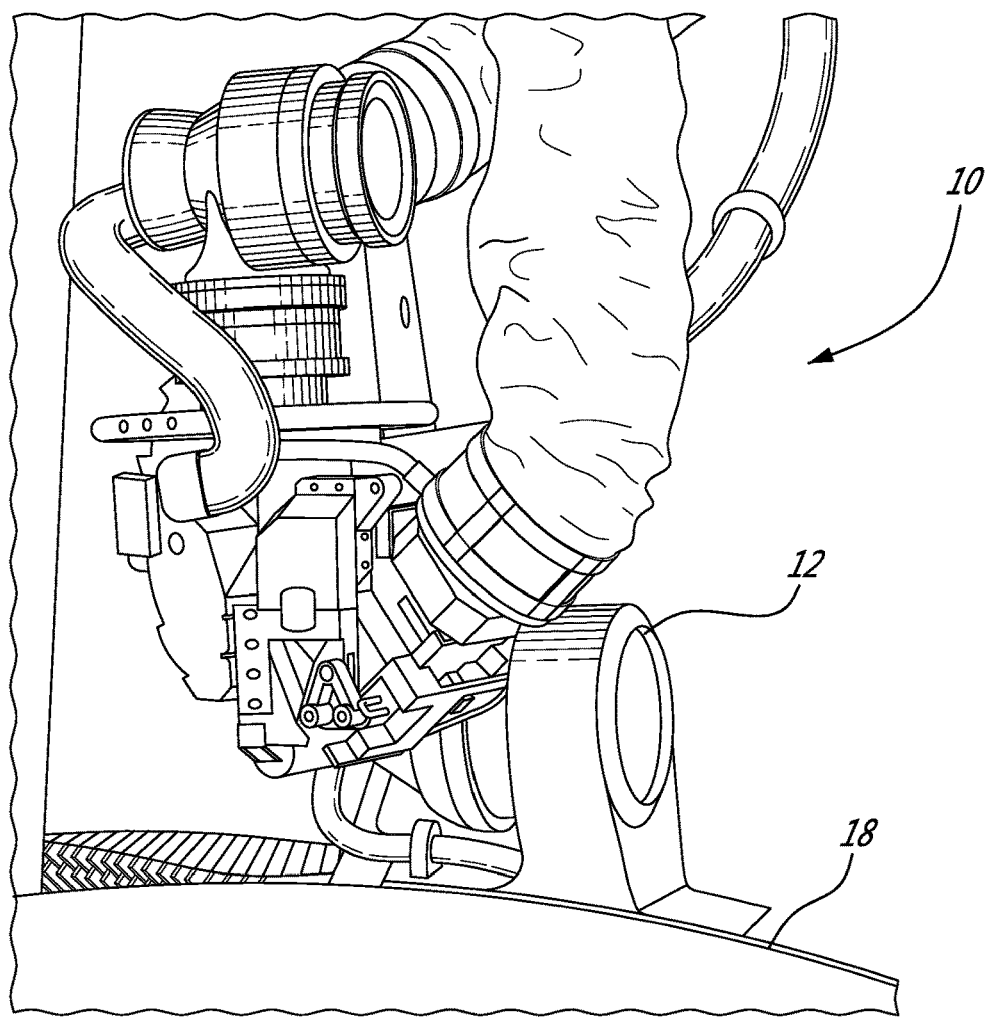
FIG. 2 is a schematic tridimensional view of an automated fiber placement (AFP) machine which may be used for example to manufacture components of the rotorcraft of FIG. 1.
Figure 3:
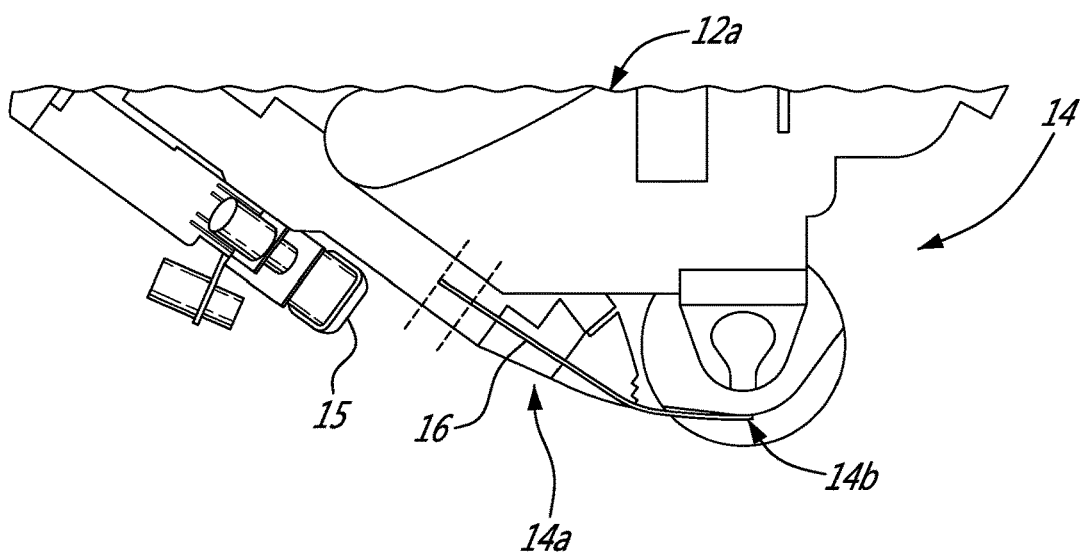
FIG. 3 is a schematic side elevation view of a nipping head of the AFP machine of FIG. 2.

Referring to FIGS. 2-3, an automated fiber placement machine, referred to herein below as an AFP machine, is shown at 10. Referring particularly to FIG. 3, the AFP machine 10 has a robotized arm 12 and a nipping head 14 secured to a distal end 12a of the robotized arm 12. The AFP machine 10 is configured to heat and compact resin pre-impregnated fibers typically provided in the form of fiber tows, where each fiber tow is formed by a bundle of fibers (e.g. carbon fibers) impregnated with resin (e.g. epoxy resin). The tows are fed to a heater 15 and the nipping head 14 includes a fiber tow dispenser 14a, and a roller 14b laying a tape or strip composed of adjacent fiber tows on a surface 18, so that the fiber tows are laid on the surface 18 adjacent one another. The AFP machine 10 is able to lay tapes 16 at a plurality of laying speeds, along a wide range of length values, and along paths having a wide range of variable or constant steering radii. In the present specification, including claims, the term "tape" is intended to include one or more fiber tows disposed adjacent to one another and configured for deposition by an AFP machine, with the number of fiber tow(s) defining the tape being determined by the specification of the AFP machine 10. In the embodiment shown, the AFP machine is a Coriolis™ AFP machine having an 8 tow, ¼ inch head. It is however understood that the present disclosure is applicable to any other suitable type AFP machine. The tapes 16 are laid by the AFP machine in uncured form, for example first against a suitable support surface (e.g. mandrel, mold, film received on a mold surface) and then in multiple layers or plies over previously laid tapes, and once all of the composite material is in place, the assembly is cured using a suitable method so as to obtain the desired component.

Figure 4:
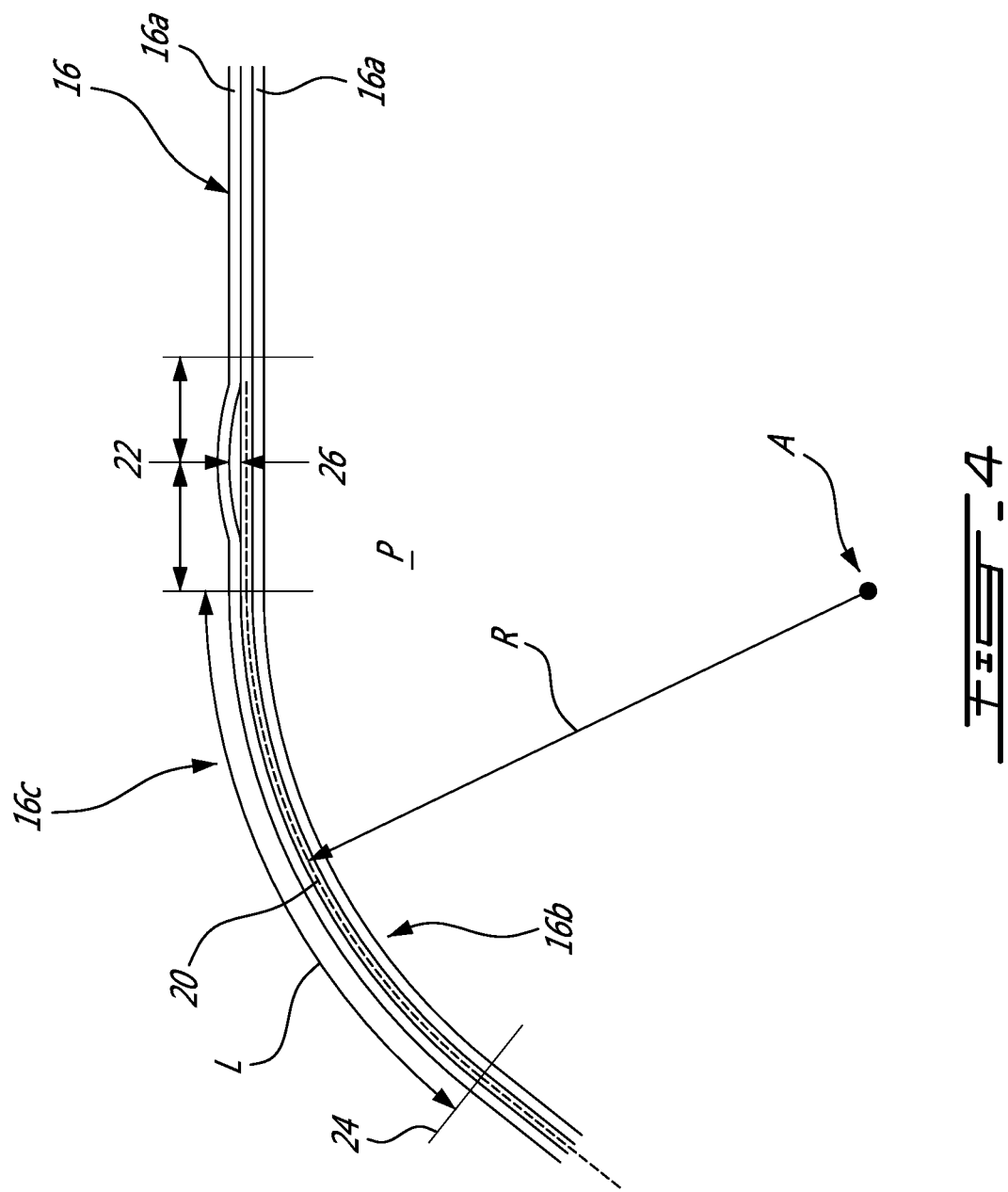
FIG. 4 is a schematic top elevation view of a fiber tow tape laid along a path having a localized curved portion by an AFP machine such as shown in FIG. 2.

Referring now also to FIG. 4, a tape 16 is shown containing three fiber tows 16a. It is understood that the tape 16 may comprise more than three fiber tows. In a particular embodiment and as mentioned above, the AFP machine 10 lays tapes 16 of eight adjacent fiber tows 16a disposed side-by-side. In a particular embodiment, the AFP machine 10 is used to manufacture sub-components of the fuselage 130 of the rotorcraft 100 (FIG. 1), such as for example a side body of the fuselage 130. Typically, such a fuselage is bottle-shaped in a transition zone between a passenger section and a tail boom section. The transition zone is convergent. Hence, the fiber tow tapes 16 must mate with each other and, to do so, must be laid following respective paths 20 having localized curved portion(s) to follow the shape of the transition zone.

However, rotating a tape 16 relative to an axis A perpendicular to the plane P of the surface it is deposited on creates a compression force on an inward side 16b of the tape 16 relative to the axis A and a tension force on an opposite, outward side 16c of the tape 16. This difference in forces combined with the movement of the robotized arm 12 may cause adjacent fiber tows 16a to separate from each other, or even create folds in the fiber tows 16a or cause the fiber tows 16a to lift from the surface in more severe conditions. Based on manufacturing trials and knowing material limits, the most current defect occurring during lamination is a gap 22 created within the plane P between two adjacent fiber tows 16a. Such a gap 22 is typically not desired because it might impair the structural integrity of the component manufactured using the AFP machine 10. Such gaps 22 are usually considered defects when their width exceeds a predetermined width threshold. In a particular embodiment applicable to the fuselage 130, the width threshold corresponds to 0.050 inch; in another particular embodiment also applicable to the fuselage 130, the width threshold corresponds to 0.100 inch, for example for a tape having a width of 0.25 inch. It is understood that any other suitable value may alternately be used.

The AFP machine can thus lay the tape 16 along a path 20 having one or more localized curved portions (also known as "excursions"); each localized curved portion has a radius R, defined and known as the steering radius. In the embodiment shown, the radius R corresponds to the radius of the curve defined by the central longitudinal axis of the tape; any other suitable definition of the radius R may alternately be used. Following experimentations, it has been discovered that the speed at which the tape 16 is laid on the surface 18 (FIG. 1) along the localized curved portion(s) of the path 20, the effective length L of each localized curved portion, the steering radius R of each localized curved portion, the material of the fiber tows forming the tapes, and the substrate material on which the tapes 16 are laid are parameters that, if not correctly tuned and associated with each other, are susceptible to induce a defect such as a gap 22 between two adjacent fiber tows 16a that has a width exceeding the given threshold. For example, it has been discovered that the AFP machine 10 might be able to lay a tape 16 along a short localized curved path portion having a small steering radius and at a high speed without creating a gap. However, laying another tape 16 of the same material along a localized curved path portion having the same steering radius but for a longer effective length might create a gap. In such a case, the gap 22 may be avoided by decreasing the speed of the AFP machine 10. It is been discovered that for a localized curved path portion having a small steering radius R, the speed should be less than that for a localized curved path portion having a larger steering radius R. For a given steering radius R, it has been discovered that the longer the localized curved portion of path 20 is, the slower the speed should be to avoid a gap 22. It has also been discovered that the relation between these three parameters is not linear for all materials over the complete spectrum.

In a particular embodiment, laying the tapes 16 as fast as possible allows for reducing manufacturing time, reducing the operating costs because the machine is in operation for less time and hence consumes less energy, increasing productivity, and hence profits. Therefore, operating the AFP machine 10 to its speed limit might be desired. In a particular embodiment, predicting material behavior allows to minimize the amount of defects, thus reducing the repair time which increases productivity and hence profit. Finally, in a particular embodiment, correlating the maximum speed with the steering radius and the effective length allows to optimize the resulting angular deviation of each ply to respect the isotropy criteria while ensuring manufacturing constrains are respected. For example, sections of a component where defects are likely to appear at a given speed may be identified. The fiber orientation for these sections of the component can then be changed to have a different steering radius reducing the risk of generating a defect, providing the change is acceptable from a stress resistance (e.g. shearing) perspective. Correlating the maximum speed with the steering radius and the effective length can thus form part of an iterative design process between stress resistance and manufacturability requirements before a final design for the component is determined.

Accordingly, in a particular embodiment, a maximum speed is determined for each localized curved portion of the curved path 20 to be followed by the tape 16 laid by the AFP machine 10. To do so, data, which may be obtained using an experimental method described herein below, is used to determine the maximum speed associated with each localized curved portion (e.g. steering radius and effective length) of a particular path. The data include combinations of effective length and steering radius reference values that are each associated with a corresponding maximum speed value, thus illustrating the maximum length for which a tape can be laid for a specific combination of steering radius reference value and speed before a predetermined defect is created. In other words, each combination of one of the effective length reference values and one of the steering radius reference values is associated with one of the corresponding maximum speed values. Each combination of effective length, steering radius and maximum speed value is such that if the AFP machine 10 is used to lay tape 16 at the maximum speed on a localized curved portion of the path 20 having the steering radius R and the effective length L of a same combination, the creation of a particular defect will be avoided. In the embodiment shown, the particular defect corresponds to a gap 22 or space between two adjacent fiber tows 16a of the tape 16 having a width corresponding to the given threshold. It is understood that similar curves can be provided for other types of defects.

In order to find the appropriate maximum speed, the effective length L and the steering radius R of the localized curved portion(s) of the path 20 to be followed by the tape 16 is determined. Since the shape of the surface 18 to be covered by the tapes and the desired orientation of each ply on the surface are defined, the operator determines the steered path which would minimize the resulting steering, thus determining the steering radius and the effective length of each localized curved portion to be followed by the tapes 16 positioned by the AFP machine 10. A correspondence is made between the effective length and the steering radius of the localized curved portion(s) of the path 20, and the combinations of effective length and steering radius reference values of the data; the maximum speed associated with the localized curved portion(s) of the path is then determined as the maximum speed value associated with the effective length and steering radius reference values of the data. Stated otherwise, the maximum speed of each path is determined in function of its effective length and steering radius of its localized curved portion(s).

For each of the path 20, the operating speed of the AFP machine is locally or globally set for laying the associated tape 16, so as to be at most the maximum speed that has been determined based on the data in function of the characteristics (e.g., effective length, steering radius) of the localized curved portion(s) of the path 20. The AFP machine 10 lays each of the tapes 16 on the surface 18 along its respective path 20 at the selected speed—for example, a constant speed for the entire path, or local speeds corresponding to different localized curved portions of the path. In each case, the selected speed may correspond to the maximum speed. Hence, the tape 16 may be laid on the surface 18 at the determined maximum speed, or at the lowest of the maximum speeds associated with its localized curved portions if more than one localized curved portion is defined. A ply of material may be deposited at a common speed, in which case the lowest maximum speed associated with the tapes forming the ply may be used as the upper threshold limit for the speed of deposition of the tapes forming that ply. Alternately, tapes forming a same ply may be deposited at different speeds from each other, providing each is laid at a speed corresponding at most to its maximum speed.

Accordingly, the speed deposition of the tapes by the AFP machine can be selected based on the data and on the effective length and steering radius of the localized curved portion(s) of the path followed by the tapes, thus avoiding the previously required "trial and error" in determining the optimal speed. In a particular embodiment, this may allow for a reduction in repair time and associated material waste during manufacturing of components.

Figure 5:
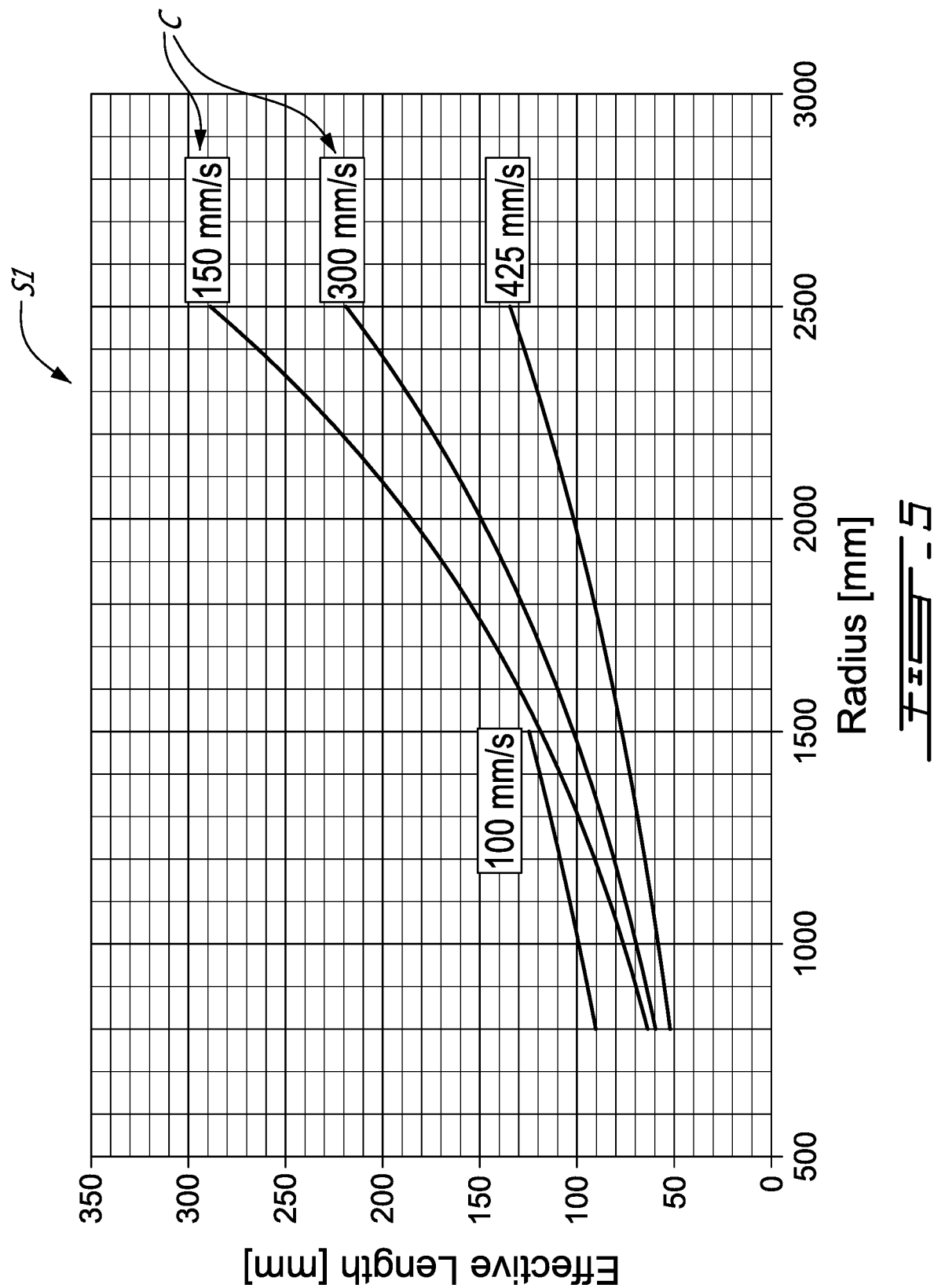
FIGS. 5-9 are graphs showing effective tape lengths as a function of a steering radius of the AFP machine of FIG. 2 for various laying speeds of the AFP machine, for tapes being laid on a previous ply of the same material as that of the tapes in FIG. 5, on a ply of uncured composite fabric such as prepreg for FIG. 6, on a layer of adhesive for FIG. 7, on a syntactic film core for FIG. 8, and on a plain surfacing film for FIG. 9.
Figure 6:
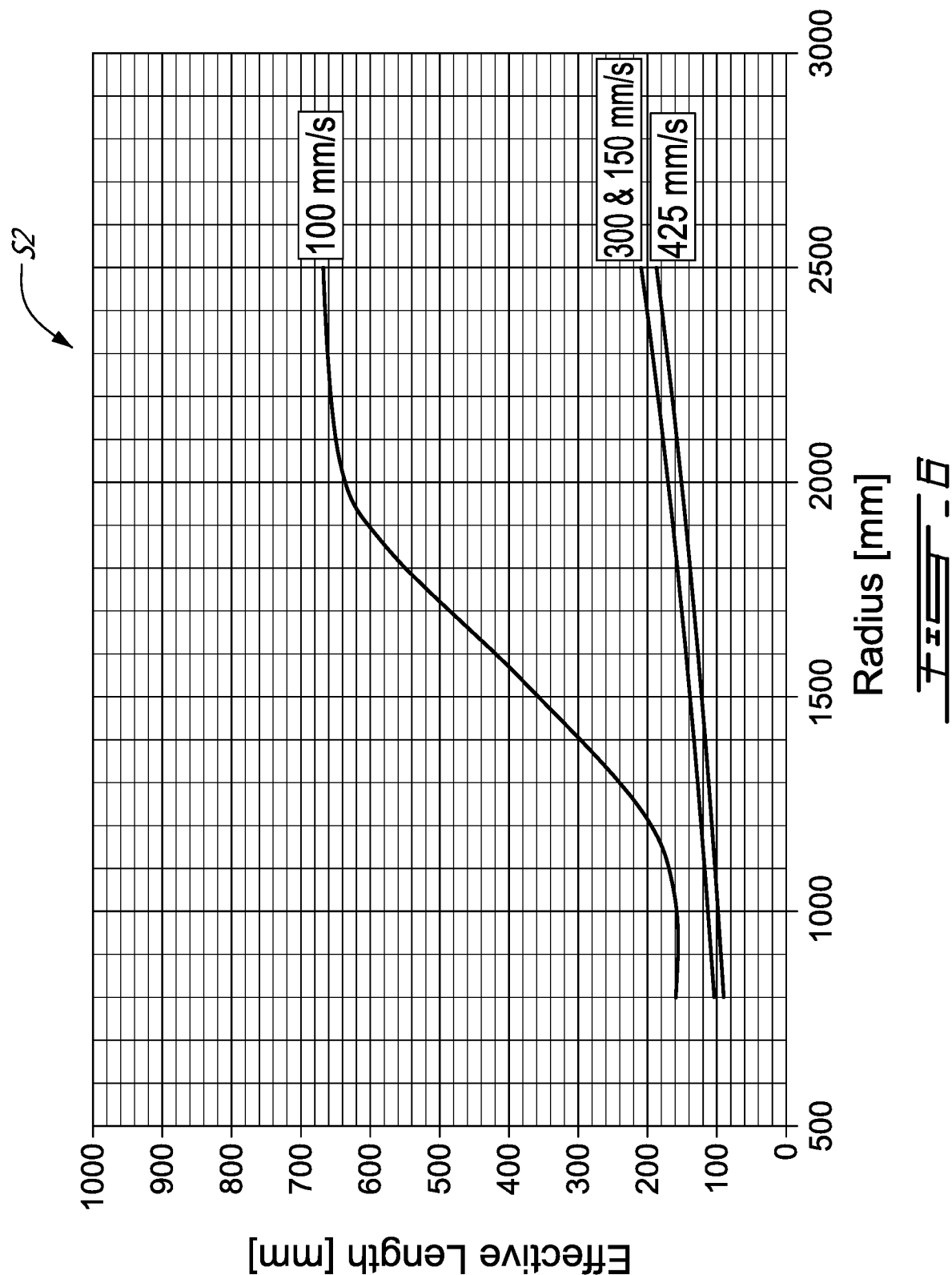
Figure 7:
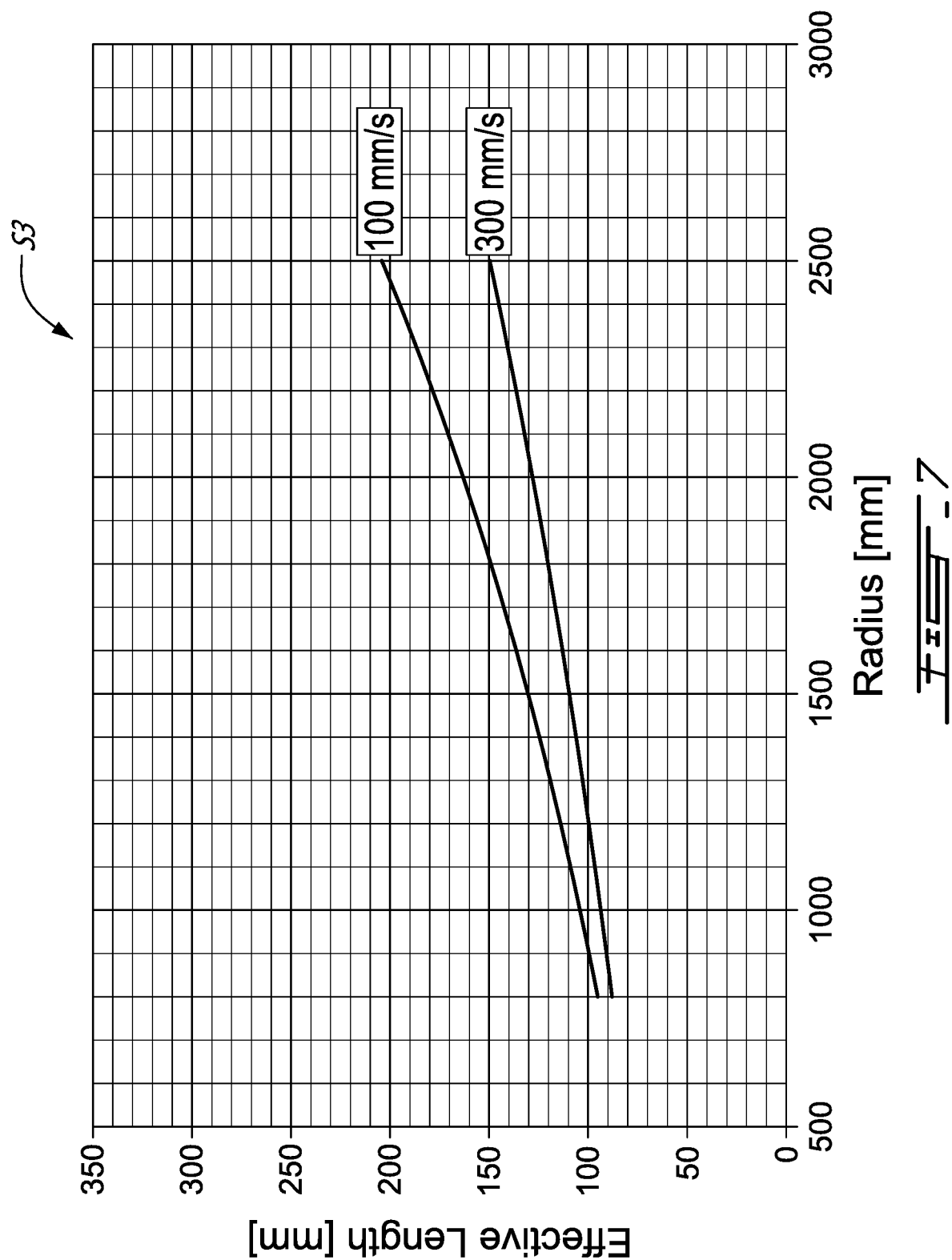
Figure 8:
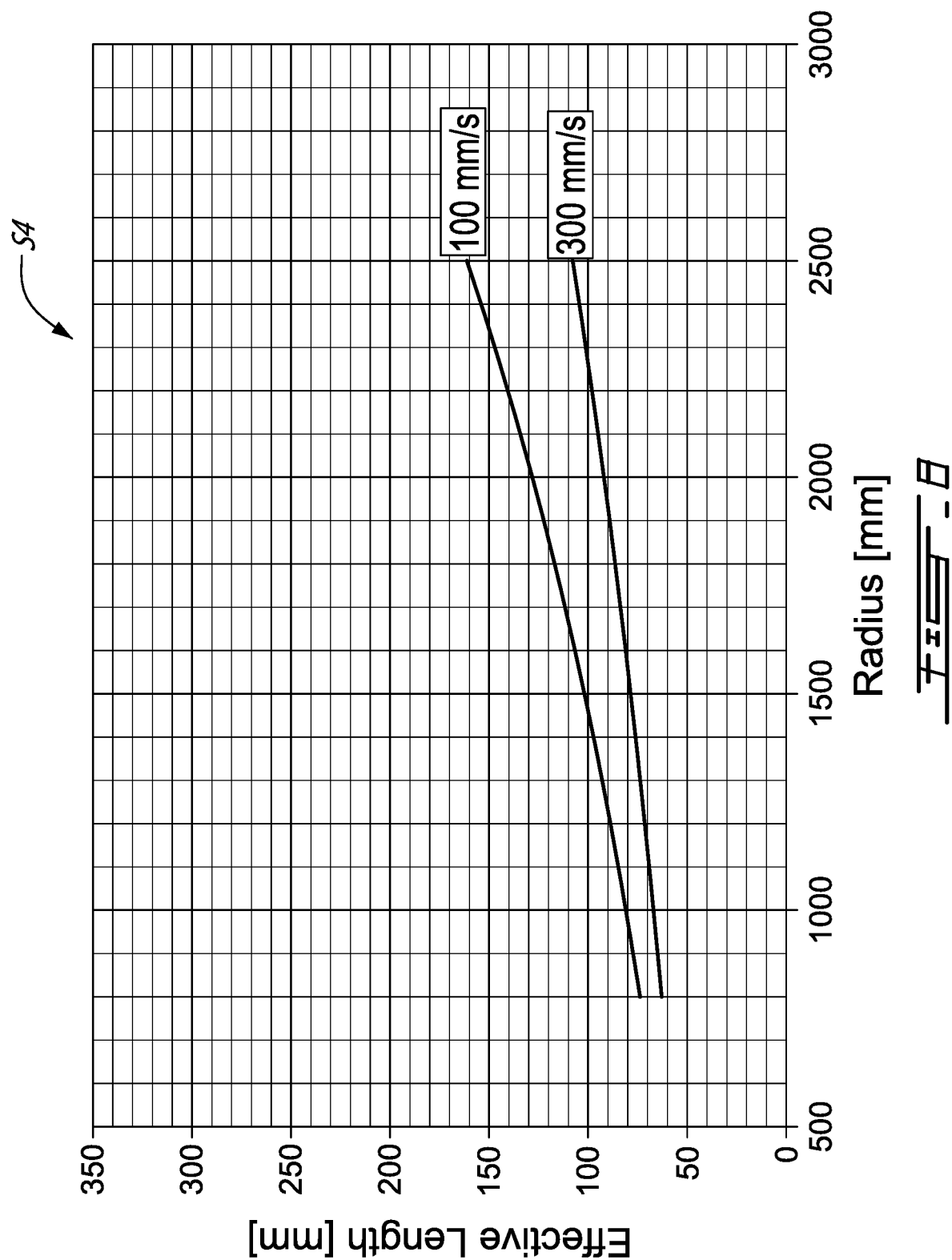
Figure 9:
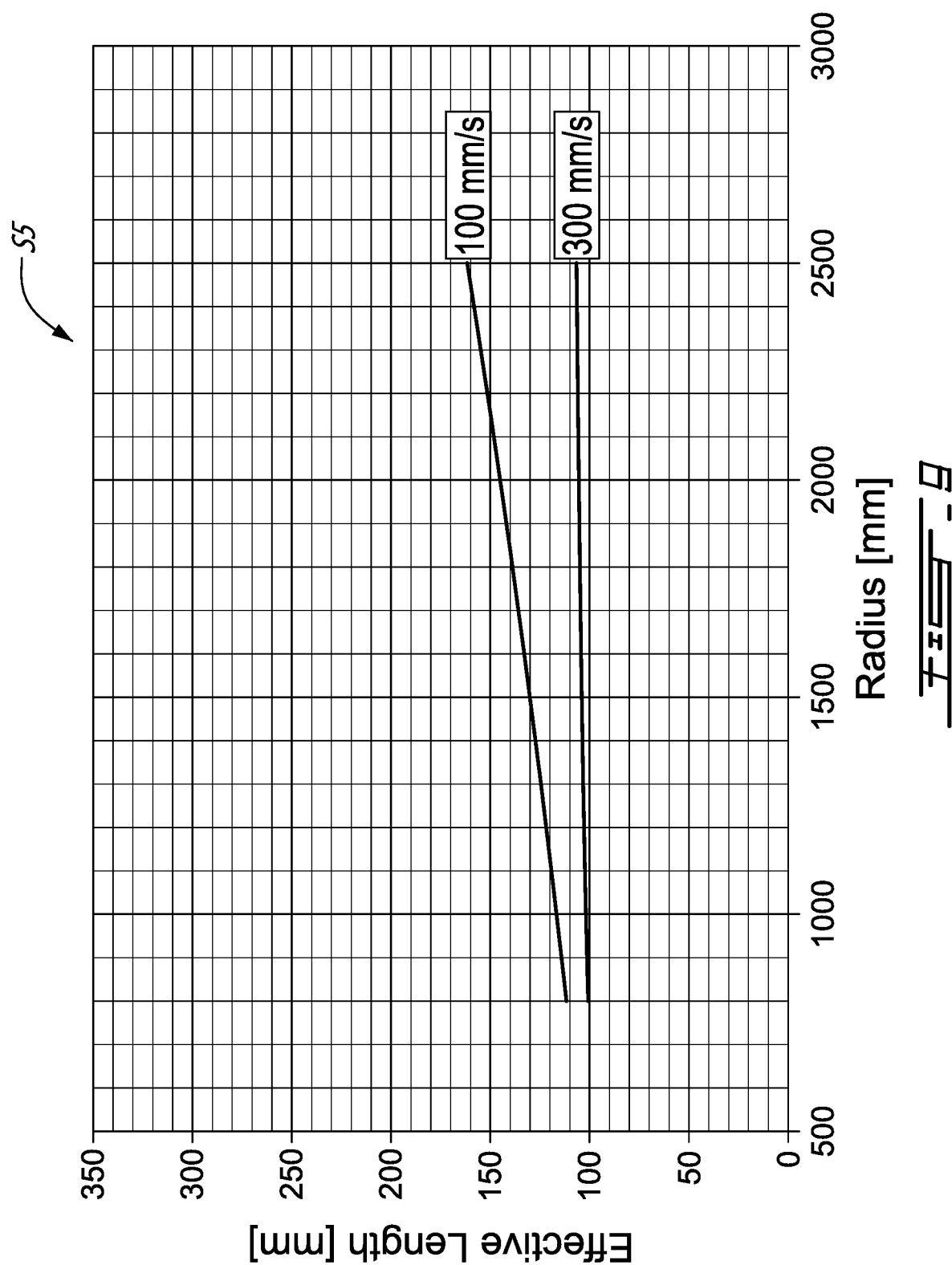

Referring now to FIG. 5, the data may be presented in the form of a graph, which in this particular embodiment is provided for tapes made of fiber tows including unidirectional carbon fiber in an epoxy resin; it is understood that different values may be provided for different tape materials. As illustrated, steering radius values are on the abscissa axis and effective length values are on the ordinate axis, and a different curve C is provided for each of a plurality of speeds. The maximum speed thus corresponds to a speed curve C that intersects a combination of a given one of the steering radius values and a given one of the effective length values. For example, in the particular embodiment shown, for a localized curved path portion having a localized steering radius of 1500 mm over an effective length of 100 mm, the maximum speed is 300 mm/s.

However, in some instances, a combination of effective length and steering radius values might intersect between two speed curves. In such a situation, the maximum speed may be taken as the speed curve that is directly above the intersection of the combination of the effective length and steering radius values, i.e. as the lower of the two maximum speed values associated with the curves C between which the points are located. For instance, for a localized curved path portion having a localized steering radius of 1500 mm over an effective length of 80 mm, the maximum speed would be 300 mm/s. It is understood that is also possible to interpolate data within the graph to obtain an intermediate speed between the two speed curves C using, for instance, a linear interpolation. Any suitable method for interpolating data may be used without departing from the scope of the present disclosure.

Referring now to FIGS. 5-9, it has been discovered that the maximum laying speed for a tape 16 also varies in function of the type of substrate material on the surface 18 the tape 16 is laid on. In the embodiment shown, the data include a plurality of sets S1, S2, S3, S4, S5. Each of the plurality of sets corresponds to a respective one of a plurality of substrate material types. Therefore, in a particular embodiment, when determining a maximum speed, the type of substrate material to be covered by the tapes 16 is considered. FIGS. 5-9 thus illustrate the data for tapes with fiber tows including unidirectional carbons fiber in an epoxy resin, and where the tapes are deposited on a previous ply of tapes laid by the AFP machine and made of the same material (S1, FIG. 5); a ply of uncured or mostly uncured composite fabric, e.g. prepreg, also made of carbon fibers in an epoxy resin (S2, FIG. 6); a layer of adhesive film (S3, FIG. 7); a syntactic film core (S4, FIG. 8); and a plain surfacing film (S5, FIG. 9). Depending on the type of substrate material the tape is to be laid on, the appropriate data set (e.g., graph) is selected to determine the maximum speed using the steps described herein above.

The same process may be required if more than one tape material is used. In that case, the data may include a plurality of graphs or tables each associated with a combination of types of substrate material and AFP tape material.

In a particular embodiment, the data is provided in the form of tables. For example, in a particular embodiment which corresponds in whole or in part to the graphs of FIGS. 5-9, the data is set forth in the following tables 1 to 5, where the effective length reference value corresponding to each steering reference value is provided as a function of the maximum speed associated with the combination of effective length and steering radius reference values:

TABLE 1

Effective length reference values (mm) for tapes deposited on a ply of similar tapes

| Steering radius reference value (mm) | Maximum speed | | | | |
|---|---|---|---|---|---|
| | 500 mm/s | 425 mm/s | 300 mm/s | 150 mm/s | 100 mm/s |
| 2500 | 134.62 | 134.62 | 218.44 | 254 | 152.4 |
| 2000 | 106.68 | 106.68 | 156.21 | 190.5 | 137.16 |
| 1750 | 81.28 | 81.28 | 111.76 | 165.1 | 139.7 |
| 1500 | 71.12 | 71.12 | 99.06 | 129.54 | 132.08 |
| 1250 | 86.36 | 86.36 | 88.9 | 96.52 | 106.68 |
| 1000 | 48.26 | 48.26 | 83.82 | 81.28 | 88.9 |
| 800 | 54.61 | 54.61 | 50.8 | 53.34 | 99.06 |

TABLE 2

Effective length reference values (mm) for tapes deposited on a ply of composite prepreg fabric with similar fiber and resin:

| Steering radius reference value (mm) | Maximum speed | | | | |
|---|---|---|---|---|---|
| | 500 mm/s | 425 mm/s | 300 mm/s | 150 mm/s | 100 mm/s |
| 2500 | 177.8 | 177.8 | 177.8 | 203.2 | 692.15 |
| 2000 | 162.56 | 162.56 | 193.04 | 158.75 | 671.83 |
| 1750 | 147.32 | 147.32 | 152.4 | 158.75 | 474.98 |
| 1500 | 116.84 | 116.84 | 160.02 | 158.75 | 434.34 |
| 1250 | 99.06 | 99.06 | 137.16 | 134.62 | 218.44 |
| 1000 | 95.25 | 95.25 | 109.22 | 97.79 | 123.19 |
| 800 | 96.52 | 96.52 | 88.9 | 97.79 | 139.7 |

TABLE 3

Effective length reference values (mm) for tapes deposited on an adhesive film:

| Steering radius reference value (mm) | Maximum speed | | |
|---|---|---|---|
| | 425 mm/s | 300 mm/s | 100 mm/s |
| 2500 | 142.24 | 134.62 | 200.66 |
| 2000 | 119.38 | 132.08 | 175.26 |
| 1750 | 127 | 127 | 144.78 |

TABLE 3-continued

Effective length reference values (mm) for tapes deposited on an adhesive film:

| Steering radius reference value (mm) | Maximum speed | | |
|---|---|---|---|
| | 425 mm/s | 300 mm/s | 100 mm/s |
| 1500 | 124.46 | 124.46 | 121.92 |
| 1250 | 119.38 | 101.6 | 116.84 |
| 1000 | 120.65 | 86.36 | 101.6 |
| 800 | 143.51 | 83.82 | 99.06 |

TABLE 4

Effective length reference values (mm) for tapes deposited on a syntactic film core:

| Steering radius reference value (mm) | Maximum speed | | |
|---|---|---|---|
| | 425 mm/s | 300 mm/s | 100 mm/s |
| 2500 | 119.38 | 99.06 | 149.86 |
| 2000 | 109.22 | 99.06 | 121.92 |
| 1750 | 106.68 | 88.9 | 121.92 |
| 1500 | 101.6 | 81.28 | 109.22 |
| 1250 | 93.98 | 73.66 | 104.14 |
| 1000 | 93.98 | 60.96 | 86.36 |
| 800 | 87.63 | 63.5 | 59.69 |

TABLE 5

Effective length reference values (mm) for tapes deposited on plain surfacing film:

| Steering radius reference value (mm) | Maximum speed | |
|---|---|---|
| | 300 mm/s | 300 mm/s |
| 2500 | 81.28 | 152.4 |
| 2000 | 111.76 | 149.86 |
| 1750 | 116.84 | 147.32 |
| 1500 | 116.84 | 121.92 |
| 1250 | 114.3 | 144.78 |
| 1000 | 104.14 | 99.06 |
| 800 | 81.28 | 114.3 |

In the embodiment shown, the data defining the graphs of FIGS. 5-9 and tables 1-5 set forth above has been generated by operating the AFP machine 10 under certain conditions representative of normal use, for example using a compacting force of 500 N, a creel chamber temperature ranging from 10 to 12 degrees Celsius, a feed tube temperature ranging from 11 to 13 degrees Celsius, a head temperature ranging from 12 to 15 degrees Celsius, a layup temperature of at most 66 degrees Celsius and a two wheel pressure of 4 MPa. Other values are also possible.

In a particular embodiment, the appropriate speed is selected upon reviewing the data S1, S2, S3, S4, S5 which may be provided in any suitable form. It is understood however that alternately, the AFP machine 10 may be pre-loaded with the data S1, S2, S3, S4, S5, and provided with a processor and with a computer-readable memory containing the data and instructions. For each of a plurality of localized curved portions, the instructions instruct the processor to determine an effective length L and a steering radius R and to determine the maximum speed that corresponds to this effective length and steering radius based on the data. Using this information, the AFP machine 10 can lay the tape at a speed that is selected to be at most the determined maximum speed. The processor is able to select the appropriate data set S1, S2, S3, S4, S4 that corresponds to the substrate material to be covered by tapes 16.

Referring back to FIG. 4, in a particular embodiment, the data is obtained as follows. A speed for laying a tape 16 with the AFP machine 10 along a test curved path 20 having a steering radius R is selected. The tape 16 is laid at the selected speed along the curved path 20. The effective length L of the curved path is measured from a starting point 24 of the curved path to at most a location 26 where the predetermined defect is created, for example where the gap 22 between two adjacent fibers tows 16a of the tape 16 has a width corresponding to the given threshold. In other words, the effective length corresponds to the distance from the beginning of the radius to the limit where the tape is exceeding specification limits.

A reference length based on the measured effective length L, and corresponding at most to the measured effective length L, is stored in association with the speed and the steering radius R to define the reference values for the effective length and steering radius. In a particular embodiment, the reference length is obtained by multiplying the measured effective length by a predetermined safety factor; for example, the safety factor may be 0.8, so that the reference length corresponds to 80% of the measured effective length. Other suitable values may alternately be used. The above process is repeated with another tape and for a plurality of speed values and/or steering radius values such as to fill a database that may be in the form of graphs, for example as shown in FIGS. 5-9, or in the form of tables, for example as shown in Tables 1-5, or in any other suitable form.

It is understood that the order of the steps for obtaining the data need not be in the order described above. For instance, an operator may consecutively lay a plurality of tapes 16 at a given speed while varying the steering radius R, or at a given steering radius R while varying the speed. Then, the operator may measure the effective length L of all of the tapes 16, and store the required values to define the data.

In the embodiment shown, the operator may repeat the above steps for each of a plurality of types of substrate material (e.g., similar tapes, uncured composite fabric such as prepreg, adhesive film, syntactic film core, surfacing film). The above steps may be repeated for different types of fiber tow materials that are laid by the AFP machine, if applicable. The data may be recorded in a database (e.g., graphs, tables).

As illustrated, the tapes are laid along paths having steering radius values that range from 800 mm to 2500 mm and effective length values that range from 50 mm to 300 mm, and for speed values that range from 100 mm/s to 500 mm/s. It is understood that these values may change depending for example on the material of the tapes, and any other relevant parameter(s).

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. A method of operating an automated fiber placement machine configured for laying a tape on a surface along a path having at least one localized curved portion, the tape being composed of fiber tows disposed side-by-side, the method comprising:
    establishing, at a processor, a correlation of maximum speeds for laying the tape on the surface to steering radii and effective lengths of curves to be followed by the tape on the surface, and generating data indicative of the correlation, the data including combinations of effective length and steering radius reference values each associated with a corresponding one of maximum speed values, where a creation of a predetermined defect in the tape is avoided when the tape is laid along a given curved path characterized by any of the combinations of effective length and steering radius reference values and laid along the given curved path at the corresponding one of the maximum speed values, the data generated by:
        a) selecting a test speed for laying a test tape with the automated fiber placement machine along a test curved path having a test steering radius;
        b) laying the test tape at the test speed and along the test curved path;
        c) measuring a length of the test curved path from a starting point of the test curved path to a location where two adjacent fiber tows of the test tape are spaced apart by a gap having a predetermined width;
        d) storing, in a database, the measured length in association with the test steering radius to define one of the combinations of effective length and steering radius reference values, in association with the test speed as the corresponding one of the maximum speeds; and
        e) repeating steps a) to d) with another test tape for other test speeds and other test steering radii;
    determining, at the processor, a steering radius of the at least one localized curved portion;
    determining, at the processor, an effective length of the at least one localized curved portion;
    determining, at the processor, based on the data, a maximum speed for laying the tape on the surface along the at least one localized curved portion, the maximum speed being determined based on the maximum speed values of the data in function of a correspondence between the effective length and the steering radius of the at least one localized curved portion and the combinations of effective length and steering radius reference values;
    selecting, at the processor, a speed for laying the tape on the surface, the selected speed being at most the maximum speed and being the fastest speed that avoids the creation of the predetermined defect in the tape; and
    laying the tape on the surface at the selected speed with the automated fiber placement machine.

2. The method of claim 1, wherein the predetermined defect is a gap of a predetermined width created between two adjacent ones of the fiber tows.

3. The method of claim 2, wherein the predetermined width is at most 0.100 inch, the tape having a width of 0.25 inch.

4. The method of claim 1, wherein the data include a plurality of sets of combinations of effective length and steering radius reference values each associated with the corresponding one of maximum speed values, each of the plurality of sets associated with a respective type of substrate material, the method further comprising:

determining a type of substrate material to be covered by the tape;

selecting one of the plurality of sets associated with the type of substrate material; and wherein determining the maximum speed at which the automated fiber placement machine lays the tape on the surface along the curved path is also performed based on the type of substrate material to be covered by the tape.

5. The method of claim 1, wherein the effective length, steering radius reference and maximum speed values of the data corresponds to the values set forth in any one of Tables 1 to 5.

6. The method of claim 1, further comprising repeating steps a) to e) for a different type of substrate material on which the test tape is laid.

7. The method of claim 1, further comprising repeating steps a) to d) for at least two other test steering radii and at least two other test speeds.

8. The method of claim 1, further comprising repeating steps a) to d) for test speed values ranging from 100 mm/s to 500 mm/s and for test steering radius values ranging from 800 mm to 2500 mm.

9. The method of claim 1, wherein step e) includes repeating steps a) and b) for a plurality of test tapes before repeating steps d) and e) for the plurality of test tapes.

10. The method of claim 1, further comprising, after step c), applying a safety factor to the measured length to determine a corrected measured length, and further wherein step e) comprises storing the corrected measured length in the database.

11. The method of claim 10, wherein the corrected measured length corresponds to 80% of the measured length.

12. The method of claim 1, wherein determining the maximum speed includes interpolating the data.

13. The method of claim 1, wherein the selected speed corresponds to the maximum speed so that laying the tape on the surface with the automated fiber placement machine is performed at the maximum speed.

14. A method of establishing a correlation of maximum speeds for laying tapes of fiber tows on a surface with an automated fiber placement machine to steering radii and effective lengths of curves to be followed by the tapes for use in determining a maximum speed for laying the tapes while avoiding a creation of a predetermined defect on the tapes laid on the surface, the method comprising:

a) selecting a speed for laying one of the tapes with the automated fiber placement machine along a curved path having a steering radius;

b) laying the tape at the speed and along the curved path;

c) measuring a length of the curved path from a starting point of the curved path to a location where the predetermined defect is created;

d) storing the speed, the steering radius and a reference length based on the measured length in association with each other; and e) repeating a) to d) with another tape for a different speed and/or a different steering radius.

15. The method of claim 14, wherein the predetermined defect is a gap having a predetermined width created between two adjacent ones of the fiber tows.

16. The method of claim 15, wherein the predetermined width is at most 0.100 inch.

17. The method of claim 14, further comprising repeating steps a) to e) for a different substrate material receiving the tape.

18. The method of claim 14, further comprising repeating steps a) to d) for at least two different steering radii and at least two different speeds.

19. The method of claim 14, further comprising repeating steps a) to d) for speed values ranging from 100 mm/s to 500 mm/s and for steering radius values ranging from 800 mm to 2500 mm.

20. The method of claim 14, wherein step e) includes repeating steps a) and b) for a plurality of tapes before repeating steps d) and e) for the plurality of tapes.

21. The method of claim 14, further comprising, between steps c) and d), multiplying the measured length by a predetermined safety factor to obtain the reference length.

* * * * *